United States Patent
Kahlon

(10) Patent No.: US 12,113,918 B2
(45) Date of Patent: Oct. 8, 2024

(54) SYSTEM AND METHOD FOR AUTHENTICATING DEVICES

(71) Applicant: CARDLATCH LTD., Rishon Lezion (IL)

(72) Inventor: Baruch Kahlon, Ashkelon (IL)

(73) Assignee: CARDLATCH LTD., Rishon Lezion (IL)

( * ) Notice: Subject to any disclaimer, the term of this patent is extended or adjusted under 35 U.S.C. 154(b) by 269 days.

(21) Appl. No.: 17/766,261

(22) PCT Filed: Oct. 4, 2020

(86) PCT No.: PCT/IL2020/051075
§ 371 (c)(1),
(2) Date: Apr. 4, 2022

(87) PCT Pub. No.: WO2021/070177
PCT Pub. Date: Apr. 15, 2021

(65) Prior Publication Data
US 2023/0291583 A1    Sep. 14, 2023

Related U.S. Application Data

(60) Provisional application No. 63/038,136, filed on Jun. 12, 2020, provisional application No. 62/913,272, filed on Oct. 10, 2019.

(51) Int. Cl.
*H04L 9/32*    (2006.01)
*H04L 9/00*    (2022.01)
(Continued)

(52) U.S. Cl.
CPC .......... *H04L 9/3297* (2013.01); *H04L 9/0825* (2013.01); *H04L 9/0833* (2013.01);
(Continued)

(58) Field of Classification Search
CPC ..... H04L 63/20; H04L 63/062; H04L 9/0825; H04L 9/0833; H04L 9/50
See application file for complete search history.

(56) References Cited

U.S. PATENT DOCUMENTS 7,185,362 B2 * 2/2007 Hawkes ................ H04L 63/062
726/19
10,491,404 B1 * 11/2019 Yamamoto ................ H04L 9/50
(Continued)

FOREIGN PATENT DOCUMENTS

WO    2015039568 A1    3/2015

OTHER PUBLICATIONS

Lacmanovic et al. "Contactless payment systems based on RFID Technology", MIPRO 2010, May 28, 2010. Retrieved on Mar. 6, 2021. Retrieved from <URL: https://ieeexplore.ieee.org/stamp/stamp.jsp?tp=&amumber-5533621> entire document.
(Continued)

*Primary Examiner* — Barbara B Anyan
(74) *Attorney, Agent, or Firm* — S.J. Intellectual Property Ltd.

(57) ABSTRACT

A system and method for authenticating an authentication requesting device (ARD) is disclosed. The system is configured to provide validation encryptions (VEs) for each given device of devices, each given encryption of the VEs being encrypted using an encryption function (EF) using a derived key (DK) generated from a currently used root key (RK) of the respective given device using a derivation function (DF) designed to generate a different derivation for identical data for each execution; obtain an authentication encryption (AE) generated by the ARD and a timestamp indicative of a time of creation of the AE, the AE being encrypted using the EF using an ARD DK generated from the currently used ARD RK, and wherein the ARD DK is generated using the DF; and authenticating the ARD only if one of the VEs matches the AE and the timestamp is within an allowed time window.

18 Claims, 4 Drawing Sheets

(51) Int. Cl.
 *H04L 9/08* (2006.01)
 *H04L 9/40* (2022.01)
(52) U.S. Cl.
 CPC ............ *H04L 9/0866* (2013.01); *H04L 9/088* (2013.01); *H04L 9/50* (2022.05); *H04L 63/062* (2013.01); *H04L 63/20* (2013.01)

(56) References Cited

U.S. PATENT DOCUMENTS

| | | |
|---|---|---|
| 10,541,995 B1 | 1/2020 | Mossler et al. |
| 2012/0266209 A1* | 10/2012 | Gooding ................. H04L 63/20 726/1 |
| 2015/0019442 A1 | 1/2015 | Hird et al. |
| 2019/0163912 A1* | 5/2019 | Kumar .................. H04L 9/0825 |
| 2019/0245835 A1* | 8/2019 | Ja .......................... H04L 9/0833 |

OTHER PUBLICATIONS

Narayan et al. "A Secure Framework for Contactless Smartcards using Authentication Server to Prevent Relay Attack", SMA 2020, Sep. 19, 2020. Retrieved on Mar. 6, 2021. Retrieved from <URL: http://manuscript1ink-society-file.s3.amazonaws.com/kism/conference/sma2020/presentation/SMA-2020_paper_91.pdf> entire document.

* cited by examiner

SYSTEM AND METHOD FOR AUTHENTICATING DEVICES

TECHNICAL FIELD

The invention relates to a system and method for authenticating devices.

BACKGROUND

Current solutions for authenticating devices use static keys. Hackers can easily create encryptions using the static keys to validly authenticate devices, and thereby maliciously access data on the devices.

There is thus a need in the art for a new system and method for authenticating devices.

GENERAL DESCRIPTION

In accordance with a first aspect of the presently disclosed subject matter, there is provided a system for authenticating devices, the system comprising a processing circuitry configured to: provide a plurality of validation encryptions including, for each given device of the devices, a plurality of encryptions of a combination of: (a) an identifier uniquely identifying the given device, (b) current Root Key (RK) information indicative of a currently used RK out of a plurality of unique RKs assigned to the given device and stored on the given device, and (c) usage information indicative of a number of usages of the currently used RK; wherein each given encryption of the validation encryptions is encrypted using an encryption function using a derived key generated from the respective currently used RK of the respective given device, and wherein the derived key is generated using a derivation function designed to generate a different derivation for identical data for each execution; obtain an authentication encryption generated by an Authentication Requesting Device (ARD) for authenticating the ARD, wherein the authentication encryption is a result of encryption of a second combination of: (a) an ARD identifier uniquely identifying the ARD, (b) current ARD RK information indicative of a currently used ARD RK out of a plurality of unique ARD RKs assigned to the ARD and stored on the ARD, and (c) ARD usage information indicative of a number of usages of the currently used ARD RK wherein the authentication encryption is encrypted using the encryption function using an ARD derived key generated from the currently used ARD RK, and wherein the ARD derived key is generated using the derivation function; obtain, along with the authentication encryption, a timestamp indicative of a time of creation of the authentication encryption; and upon one of the validation encryptions matching the authentication encryption and the timestamp being within an allowed time window from an authentication attempt time, authenticate the ARD, and upon none of the validation encryptions matching the authentication encryption or the timestamp not being within the allowed time window, not authenticate the ARD.

In some cases, the current RK information is a currently used RK index, being an index of a currently used RK of the respective given device.

In some cases, upon authentication of the ARD, the processing circuitry is further configured to provide the ARD identifier to an access control management system, thereby enabling the ARD to access the access control management system.

In some cases, the validation encryptions are generated by the processing circuitry.

In some cases, the ARD is one of: a smartcard, a smartphone, or an Internet of Things (IoT) device.

In some cases, each of the unique RKs has a predetermined maximal number of allowed usages for authentication.

In some cases, the authentication encryption is generated by an application installed on the ARD, and the plurality of unique ARD RKs assigned to the ARD are stored on a portion of the ARD inaccessible to applications other than the application.

In some cases, each of the unique ARD RKs is stored on the portion in a distributed manner so that at least a first part of a respective unique ARD RK of the unique ARD RKs is stored in a first location of the portion and a second part of the respective unique ARD RK is stored in a second location of the portion other than the first location.

In some cases, a number of the plurality of validation encryptions is pre-determined.

In accordance with a second aspect of the presently disclosed subject matter, there is provided a device comprising a processing circuitry configured to: provide (a) a device identifier uniquely identifying the device, (b) current device root key information indicative of a currently used device root key out of a plurality of unique root keys assigned to the device and stored on the device, and (c) device root key usage information indicative of a number of usages of the currently used device root key; generate a derived key from the currently used device root key, using a derivation function designed to generate a different derivation for identical data for each execution; encrypt, using an encryption function using the derived key, a combination of: (a) the device identifier, (b) the current device root key information, and (c) the device root key usage information, giving rise to an authentication encryption; and send the authentication encryption and a timestamp indicative of a time of creation of the authentication encryption to a device authentication system, thereby enabling authentication of the device, wherein the device is authenticated by the device authentication system if: (a) the authentication encryption is valid and (b) the timestamp is within an allowed time window from an authentication attempt time.

In some cases, the current device root key information is a current device root key index, being an index of the currently used device root key.

In some cases, the processing circuitry is further configured to receive an authentication response from the device authentication system.

In some cases, the authentication response is an indication of a result of the authentication.

In some cases, sending the authentication encryption to the device authentication system causes the device authentication system to send the device identifier to an access control management system upon successful authentication of the device, thereby enabling the device to access the access control management system.

In some cases, the device is one of: a smartcard, a smartphone, or an Internet of Things (IoT) device.

In some cases, each of the unique root keys has a predetermined maximal number of allowed usages for authentication and upon reaching the maximal number of allowed usages for a given root key of the unique root keys, the given root key is not used for the authentication.

In some cases, the authentication encryption is generated by an application installed on the device, and wherein the plurality of unique root keys assigned to the device are stored on a portion of the device inaccessible to applications other than the application.

In some cases, each of the unique root keys is stored on the portion in a distributed manner so that at least a first part of a respective unique root key of the unique root keys is stored in a first location of the portion and a second part of the respective unique root key is stored in a second location of the portion different than the first location.

In accordance with a third aspect of the presently disclosed subject matter, there is provided a method for authenticating devices, the method comprising: providing a plurality of validation encryptions including, for each given device of the devices, a plurality of encryptions of a combination of: (a) an identifier uniquely identifying the given device, (b) current Root Key (RK) information indicative of a currently used RK out of a plurality of unique RKs assigned to the given device and stored on the given device, and (c) usage information indicative of a number of usages of the currently used RK; wherein each given encryption of the validation encryptions is encrypted using an encryption function using a derived key generated from the respective currently used RK of the respective given device, and wherein the derived key is generated using a derivation function designed to generate a different derivation for identical data for each execution; obtaining an authentication encryption generated by an Authentication Requesting Device (ARD) for authenticating the ARD, wherein the authentication encryption is a result of encryption of a second combination of: (a) an ARD identifier uniquely identifying the ARD, (b) current ARD RK information indicative of a currently used ARD RK out of a plurality of unique ARD RKs assigned to the ARD and stored on the ARD, and (c) ARD usage information indicative of a number of usages of the currently used ARD RK; wherein the authentication encryption is encrypted using the encryption function using an ARD derived key generated from the currently used ARD RK, and wherein the ARD derived key is generated using the derivation function; obtaining, along with the authentication encryption, a timestamp indicative of a time of creation of the authentication encryption; and upon one of the validation encryptions matching the authentication encryption and the timestamp being within an allowed time window from an authentication attempt time, authenticating the ARD, and upon none of the validation encryptions matching the authentication encryption or the timestamp not being within the allowed time window, not authenticating the ARD.

In some cases, the current RK information is a currently used RK index, being an index of a currently used RK of the respective given device.

In some cases, upon authentication of the ARD, the method further comprises: providing the ARD identifier to an access control management system, thereby enabling the ARD to access the access control management system.

In some cases, providing the plurality of validation encryptions includes generating the validation encryptions.

In some cases, the ARD is one of: a smartcard, a smartphone, or an Internet of Things (IoT) device.

In some cases, each of the unique RKs has a predetermined maximal number of allowed usages for authentication.

In some cases, the authentication encryption is generated by an application installed on the ARD, and the plurality of unique ARD RKs assigned to the ARD are stored on a portion of the ARD inaccessible to applications other than the application.

In some cases, each of the unique ARD RKs is stored on the portion in a distributed manner so that at least a first part of a respective unique ARD RK of the unique ARD RKs is stored in a first location of the portion and a second part of the respective unique ARD RK is stored in a second location of the portion other than the first location.

In some cases, a number of the plurality of validation encryptions is pre-determined.

In accordance with a fourth aspect of the presently disclosed subject matter, there is provided a method comprising: providing (a) a device identifier uniquely identifying a device, (b) current device root key information indicative of a currently used device root key out of a plurality of unique root keys assigned to the device and stored on the device, and (c) device root key usage information indicative of a number of usages of the currently used device root key; generating a derived key from the currently used device root key, using a derivation function designed to generate a different derivation for identical data for each execution; encrypting, using an encryption function using the derived key, a combination of: (a) the device identifier, (b) the current device root key information, and (c) the device root key usage information, giving rise to an authentication encryption; and sending the authentication encryption and a timestamp indicative of a time of creation of the authentication encryption to a device authentication system, thereby enabling authentication of the device, wherein the device is authenticated by the device authentication system if: (a) the authentication encryption is valid and (b) the timestamp is within an allowed time window from an authentication attempt time.

In some cases, the current device root key information is a current device root key index, being an index of the currently used device root key.

In some cases, the method further comprises: receiving an authentication response from the device authentication system.

In some cases, the authentication response is an indication of a result of the authentication.

In some cases, sending the authentication encryption to the device authentication system causes the device authentication system to send the device identifier to an access control management system upon successful authentication of the device, thereby enabling the device to access the access control management system.

In some cases, the device is one of: a smartcard, a smartphone, or an Internet of Things (IoT) device.

In some cases, each of the unique root keys has a predetermined maximal number of allowed usages for authentication, and upon reaching the maximal number of allowed usages for a given root key of the unique root keys, the given root key is not used for the authentication.

In some cases, the authentication encryption is generated by an application installed on the device, and the plurality of unique root keys assigned to the device are stored on a portion of the device inaccessible to applications other than the application.

In some cases, each of the unique root keys is stored on the portion in a distributed manner so that at least a first part of a respective unique root key of the unique root keys is stored in a first location of the portion and a second part of the respective unique root key is stored in a second location of the portion different than the first location.

In accordance with a fifth aspect of the presently disclosed subject matter, there is provided a non-transitory computer readable storage medium having computer readable program code embodied therewith, the computer readable program code, executable by processing circuitry of a computer to perform a method for authenticating devices, the method comprising: providing a plurality of validation encryptions including, for each given device of the devices, a plurality of encryptions of a combination of: (a) an identifier uniquely identifying the given device, (b) current Root Key (RK) information indicative of a currently used RK out of a plurality of unique RKs assigned to the given device and stored on the given device, and (c) usage information indicative of a number of usages of the currently used RK; wherein each given encryption of the validation encryptions is encrypted using an encryption function using a derived key generated from the respective currently used RK of the respective given device, and wherein the derived key is generated using a derivation function designed to generate a different derivation for identical data for each execution; obtaining an authentication encryption generated by an Authentication Requesting Device (ARD) for authenticating the ARD, wherein the authentication encryption is a result of encryption of a second combination of: (a) an ARD identifier uniquely identifying the ARD, (b) current ARD RK information indicative of a currently used ARD RK out of a plurality of unique ARD RKs assigned to the ARD and stored on the ARD, and (c) ARD usage information indicative of a number of usages of the currently used ARD RK; wherein the authentication encryption is encrypted using the encryption function using an ARD derived key generated from the currently used ARD RK, and wherein the ARD derived key is generated using the derivation function; obtaining, along with the authentication encryption, a timestamp indicative of a time of creation of the authentication encryption; and upon one of the validation encryptions matching the authentication encryption and the timestamp being within an allowed time window from an authentication attempt time, authenticating the ARD, and upon none of the validation encryptions matching the authentication encryption or the timestamp not being within the allowed time window, not authenticating the ARD.

In accordance with a sixth aspect of the presently disclosed subject matter, there is provided a non-transitory computer readable storage medium having computer readable program code embodied therewith, the computer readable program code, executable by processing circuitry of a computer to perform a method comprising: providing (a) a device identifier uniquely identifying a device, (b) current device root key information indicative of a currently used device root key out of a plurality of unique root keys assigned to the device and stored on the device, and (c) device root key usage information indicative of a number of usages of the currently used device root key; generating a derived key from the currently used device root key, using a derivation function designed to generate a different derivation for identical data for each execution; encrypting, using an encryption function using the derived key, a combination of: (a) the device identifier, (b) the current device root key information, and (c) the device root key usage information, giving rise to an authentication encryption; and sending the authentication encryption and a timestamp indicative of a time of creation of the authentication encryption to a device authentication system, thereby enabling authentication of the device, wherein the device is authenticated by the device authentication system if: (a) the authentication encryption is valid and (b) the timestamp is within an allowed time window from an authentication attempt time.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
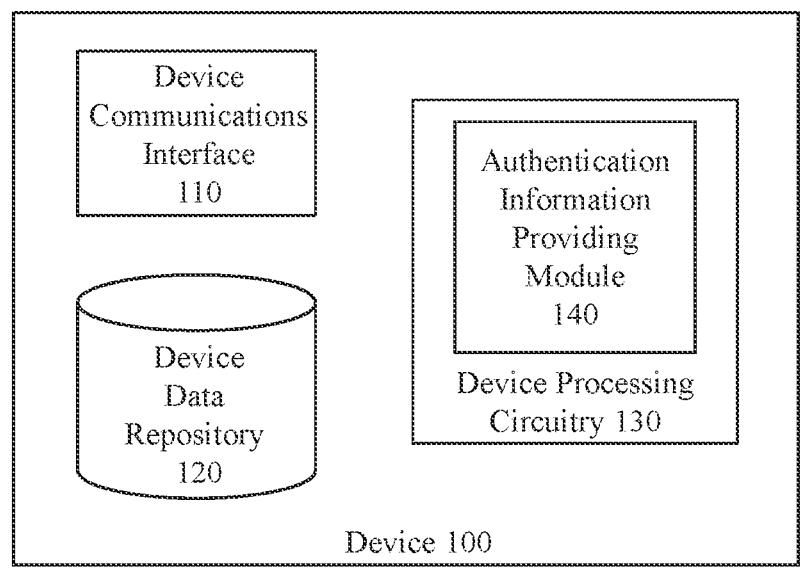
FIG. 1 is a block diagram schematically illustrating an example of a device, in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "providing", "obtaining", "authenticating", "generating", "encrypting", "sending", "receiving" or the like, include actions and/or processes, including, inter alia, actions and/or processes of a computer, that manipulate and/or transform data into other data, said data represented as physical quantities, e.g. such as electronic quantities, and/or said data representing the physical objects. The terms "computer", "processor", "processing circuitry" and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field-programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 2:
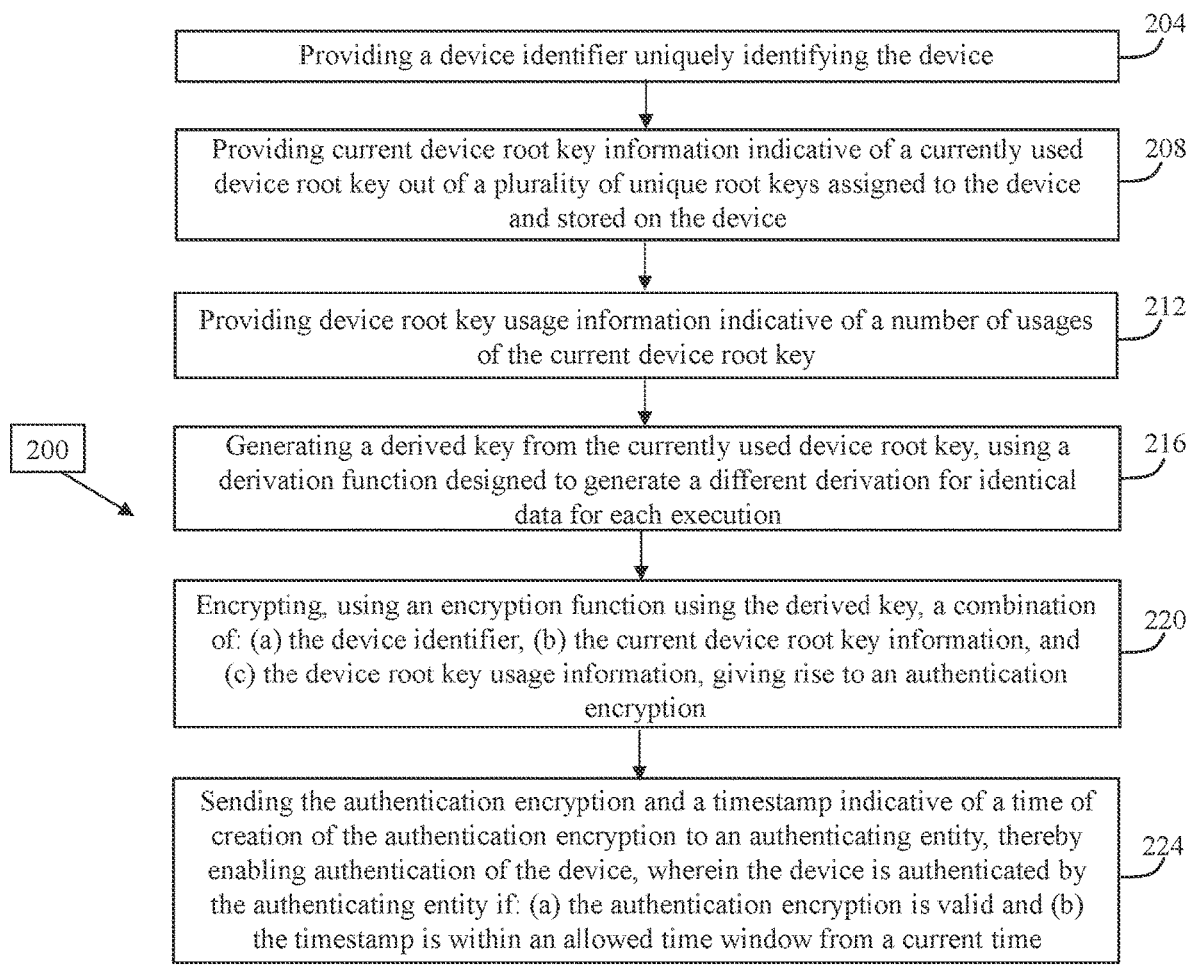
FIG. 2 is a flowchart illustrating an example of a method for providing authentication information for authenticating the device, in accordance with the presently disclosed subject matter.
Figure 3:
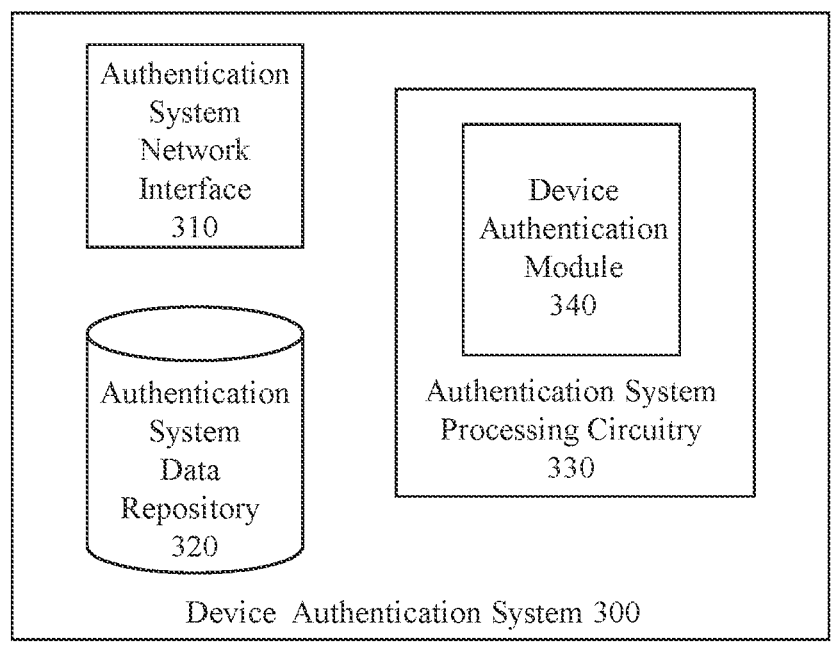
FIG. 3 is a block diagram schematically illustrating an example of a device authentication system, in accordance with the presently disclosed subject matter.
Figure 4:
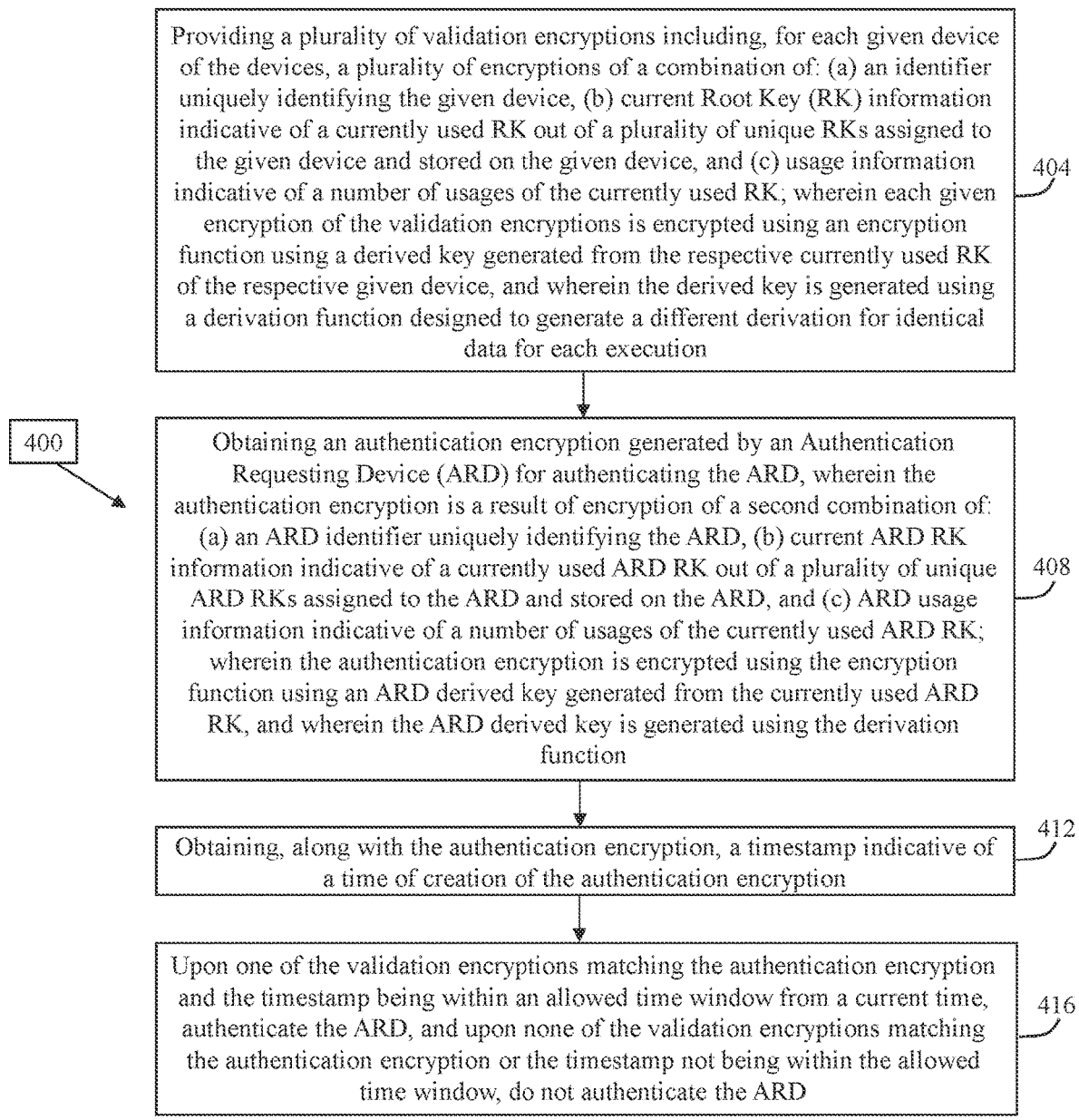
FIG. 4 is a flowchart illustrating an example of a method for authenticating devices, in accordance with the presently disclosed subject matter.

In embodiments of the presently disclosed subject matter, fewer, more and/or different stages than those shown in FIGS. 2 and 4 may be executed. In embodiments of the presently disclosed subject matter one or more stages illustrated in FIGS. 2 and 4 may be executed in a different order and/or one or more groups of stages may be executed simultaneously. FIGS. 1 and 3 illustrate general schematics of a device or system architecture, in accordance with embodiments of the presently disclosed subject matter. Each module in FIGS. 1 and 3 can be made up of any combination of software, hardware and/or firmware that performs the functions as defined and explained herein. The modules in FIGS. 1 and 3 may be centralized in one location or dispersed over more than one location. In other embodiments of the presently disclosed subject matter, the system may comprise fewer, more, and/or different modules than those shown in FIGS. 1 and 3.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Attention is now drawn to FIG. 1, a block diagram schematically illustrating an example of a device 100, in accordance with the presently disclosed subject matter.

In accordance with the presently disclosed subject matter, device 100 can comprise a device communications interface 110. Device communications interface 110 can be configured to enable the device 100 to send data and receive data sent thereto. In some cases, device communications interface 110 can be configured to enable the device 100 to send data to a single other device and to receive data sent thereto from the single other device. For example, if device 100 is a smartcard, device communications interface 110 can be configured to enable the device 100 to send authentication information to a card reader (not shown), and to receive a reader identifier (ID) identifying the card reader, as detailed further below, inter alia with reference to FIG. 2. Alternatively, in some cases, device communications interface 110 can be configured to connect the device 100 to a communications network to enable the device 100 to send data, including authentication information, and to receive data sent thereto through the communications network.

Device 100 can further comprise or be otherwise associated with a device data repository 120 (e.g. a database, a storage system, a memory including Read Only Memory—ROM, Random Access Memory—RAM, or any other type of memory, etc.) configured to store data. The data stored includes (a) a device identifier uniquely identifying the device 100, (b) a plurality of unique root keys assigned to the device 100, (c) current device root key information indicative of a currently used device root key out of the plurality of unique root keys assigned to the device 100, and (d) device root key usage information indicative of a number of usages of the current device root key. In some cases, device data repository 120 can be further configured to enable retrieval and/or update and/or deletion of the stored data. It is to be noted that in some cases, device data repository 120 can be distributed.

Device 100 further comprises device processing circuitry 130. Device processing circuitry 130 can include one or more processing units (e.g. central processing units), microprocessors, microcontrollers (e.g. microcontroller units (MCUs)) or any other computing devices or modules, including multiple and/or parallel and/or distributed processing units, which are adapted to independently or cooperatively process data for controlling relevant device 100 resources and for enabling operations related to device 100 resources.

Device processing circuitry 130 can be configured to include an authentication information providing module 140. Authentication information providing module 140 can be configured to provide authentication information for authenticating the device 100, as detailed further herein, inter alia with reference to FIG. 2.

In some cases, device 100 can be one of: a smartcard, a smartphone, or an Internet of Things (IoT) device.

Attention is now drawn to FIG. 2, a flowchart illustrating an example of a method for providing authentication information for authenticating the device 100, in accordance with the presently disclosed subject matter.

In accordance with the presently disclosed subject matter, device processing circuitry 130 can be configured to provide a device identifier uniquely identifying the device 100 (block 204).

Device processing circuitry 130 can also be configured to provide current device root key information indicative of a currently used device root key out of a plurality of unique root keys assigned to the device 100 and stored on the device 100 (block 208).

In some cases, the current device root key information can be a current device root key index, being an index of the currently used device root key. Device processing circuitry 130 can be configured to extract the currently used device root key, based on the current device root key index. Alternatively, in some cases, the current device root key information can be the currently used device root key.

Device processing circuitry 130 can be further configured to provide device root key usage information indicative of a number of usages of the currently used device root key (block 212).

In some cases, each of the unique root keys has a predetermined maximal number of allowed usages for authentication and wherein upon reaching the maximal number of allowed usages for a given root key of the unique root keys, the given root key is not used for the authentication.

Device processing circuitry 130 can be configured to generate a derived key from the currently used device root key, using a derivation function designed to generate a different derivation for identical data for each execution (block 216).

Device processing circuitry 130 can also be configured to encrypt, using an encryption function using the derived key, a combination of: (a) the device identifier, (b) the current device root key information, and (c) the device root key usage information, giving rise to an authentication encryption (block 220). Upon generating the authentication encryption, data processing circuitry 130 can be configured to update the device root key usage information to be indicative of an additional usage of the currently used device root key, or alternatively, in the event that the currently used device route key has reached the maximal number of allowed usages for the currently used device route key, to update the current device root key information to be indicative of a new used device root key out of the plurality of unique root keys assigned to the device 100.

In some cases, the authentication encryption is generated by an application installed on the device 100, and wherein the plurality of unique root keys assigned to the device 100 are stored on a portion of the device 100 inaccessible to applications other than the application.

Moreover, in some cases, each of the unique root keys is stored on the portion in a distributed manner so that at least a first part of a respective unique root key of the unique root keys is stored in a first location of the portion and a second part of the respective unique root key is stored in a second location of the portion different than the first location.

Device processing circuitry 130 can be configured to send the authentication encryption and a timestamp indicative of a time of creation of the authentication encryption, directly or indirectly, to a device authentication system, thereby enabling authentication of the device 100, wherein the device 100 is authenticated by the device authentication system if: (a) the authentication encryption is valid and (b) the timestamp is within an allowed time window from an authentication attempt time, being the time at which the device authentication system attempts to authenticate the device (block 224). The device authentication system and the operations performed thereby to authenticate devices are detailed further herein, inter alia with reference to FIGS. 3 and 4.

As noted above, in some cases, data processing circuitry 130 can be configured to indirectly send the authentication encryption and the timestamp to the device authentication system. For example, if device 100 is a smartcard, data processing circuitry 130 can be configured to send the authentication encryption to a card reader that reads the smartcard, and the card reader can then send the authentication encryption, directly or indirectly, to the device authentication system. In some cases, if device 100 is a smartcard, data processing circuitry 130 can be further configured to: (a) receive a reader ID from the card reader; (b) sign the timestamp and the reader ID; and (c) send a certificate to the device authentication system, via the card reader, the certificate including the authentication encryption, the timestamp, the reader ID and the signature.

In some cases, device processing circuitry 130 can be further configured to receive an authentication response from the device authentication system. In some cases, the authentication response can be an indication of a result of the authentication.

In some cases, sending the authentication encryption to the device authentication system causes the device authentication system to send the device identifier to an access control management system upon successful authentication of the device 100, thereby enabling the device 100 to access the access control management system.

Attention is now drawn to FIG. 3, a block diagram schematically illustrating an example of a device authentication system 300, in accordance with the presently disclosed subject matter.

In accordance with the presently disclosed subject matter, device authentication system 300 comprises an authentication system network interface 310 that is configured to connect the device authentication system 300 to a communication network. Authentication system network interface 310 can be configured to enable the device authentication system 300 to send data and receive data sent thereto through the communication network.

Device authentication system 300 can further comprise or be otherwise associated with an authentication system data repository 320 (e.g. a database, a storage system, a memory including Read Only Memory—ROM, Random Access Memory—RAM, or any other type of memory, etc.) configured to store data. The data stored includes a plurality of validation encryptions. In some cases, authentication system data repository 320 can be further configured to enable retrieval and/or update and/or deletion of the stored data. It is to be noted that in some cases, authentication system data repository 320 can be distributed.

Device authentication system 300 further comprises authentication system processing circuitry 330. Authentication system processing circuitry 330 can include one or more processing units (e.g. central processing units), microprocessors, microcontrollers (e.g. microcontroller units (MCUs)) or any other computing devices or modules, including multiple and/or parallel and/or distributed processing units, which are adapted to independently or cooperatively process data for controlling relevant device authentication system 300 resources and for enabling operations related to device authentication system 300 resources.

Authentication system processing circuitry 330 can be configured to include a device authentication module 340. Device authentication module 340 can be configured to authenticate devices, as detailed further herein, inter alia with reference to FIG. 4.

Attention is now drawn to FIG. 4, a flowchart illustrating an example of a method for authenticating devices, in accordance with the presently disclosed subject matter.

In accordance with the presently disclosed subject matter, authentication system processing circuitry 330 can be configured to provide a plurality of validation encryptions including, for each given device of the devices that are capable of being authenticated by device authentication system 300, a plurality of encryptions of a combination of: (a) an identifier uniquely identifying the given device, (b) current Root Key (RK) information indicative of a currently used RK out of a plurality of unique RKs assigned to the given device and stored on the given device, and (c) usage information indicative of a number of usages of the currently used RK, wherein each given encryption of the validation encryptions is encrypted using an encryption function using a derived key generated from the respective currently used RK of the respective given device, and wherein the derived key is generated using a derivation function designed to generate a different derivation for identical data for each execution (block 404).

In some cases, the validation encryptions can be generated by authentication system processing circuitry 330.

In some cases, a number of the plurality of validation encryptions can be pre-determined.

In some cases, the current root key information can be a currently used root key index, being an index of the currently used root key of the respective given device. Alternatively, in some cases, the current root key information can be the currently used root key.

In some cases, each of the unique RKs has a predetermined maximal number of allowed usages for authentication.

Authentication system processing circuitry 330 can be further configured to obtain an authentication encryption generated by an Authentication Requesting Device (ARD) (e.g., device 100) for authenticating the ARD, wherein the authentication encryption is a result of encryption of a second combination of: (a) an ARD identifier uniquely identifying the ARD, (b) current ARD RK information indicative of a currently used ARD RK out of a plurality of unique ARD RKs assigned to the ARD and stored on the ARD, and (c) ARD usage information indicative of a number of usages of the currently used ARD RK; wherein the authentication encryption is encrypted using the encryption function using an ARD derived key generated from the currently used ARD RK, and wherein the ARD derived key is generated using the derivation function (block 408).

In some cases, the ARD can be one of: a smartcard, a smartphone, or an Internet of Things (IoT) device.

In some cases, the current ARD RK information can be a currently used ARD RK index, being an index of the currently used ARD RK of the ARD. Alternatively, in some cases, the current ARD RK information can be the currently used ARD RK.

In some cases, the authentication encryption can be generated by an application installed on the ARD, and wherein the plurality of unique ARD RKs assigned to the ARD are stored on a portion of the ARD inaccessible to applications other than the application.

Moreover, in some cases, each of the unique ARD RKs can be stored on the portion of the ARD in a distributed manner so that at least a first part of a respective unique ARD RK of the unique ARD RKs is stored in a first location of the portion and a second part of the respective unique ARD RK is stored in a second location of the portion other than the first location.

Authentication system processing circuitry 330 can be further configured to obtain, along with the authentication encryption, a timestamp indicative of a time of creation of the authentication encryption (block 412).

Upon one of the validation encryptions matching the authentication encryption and the timestamp being within an allowed time window from an authentication attempt time, being the time at which the device authentication system 300 attempts to authenticate the ARD, authentication system processing circuitry 330 can be configured, to authenticate the ARD, and upon none of the validation encryptions matching the authentication encryption or the timestamp not being within the allowed time window, authentication system processing circuitry 330 can be configured to not authenticate the ARD (block 416).

Upon authenticating the ARD, authentication system processing circuitry 330 can be configured to update the ARD root key usage information to be indicative of an additional usage of the currently used ARD RK, or alternatively, in the event that the currently used ARD RK has reached the maximal number of allowed usages for the currently used ARD RK, to update the current ARD RK information to be indicative of a new used ARD RK out of the plurality of unique root keys assigned to the ARD.

In some cases, upon authentication of the ARD, authentication system processing circuitry 330 can be further configured to provide the ARD identifier to an access control management system (not shown), thereby enabling the ARD to access the access control management system.

It is to be noted that, with reference to FIGS. 2 and 4, some of the blocks can be integrated into a consolidated block or can be broken down to a few blocks and/or other blocks may be added. It is to be further noted that some of the blocks are optional. It should be also noted that whilst the flow diagrams are described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A system for authenticating devices, the system comprising a processing circuitry configured to:
provide a plurality of validation encryptions including, for each given device of the devices, a plurality of encryptions of a combination of: (a) an identifier uniquely identifying the given device, (b) current Root Key (RK) information indicative of a currently used RK out of a plurality of unique RKs assigned to the given device and stored on the given device, and (c) usage information indicative of a number of usages of the currently used RK; wherein each given encryption of the validation encryptions is encrypted using an encryption function using a derived key generated from the respective currently used RK of the respective given device, and wherein the derived key is generated using a derivation function designed to generate a different derivation for identical data for each execution;
obtain an authentication encryption generated by an Authentication Requesting Device (ARD) for authenticating the ARD, wherein the authentication encryption is a result of encryption of a second combination of: (a) an ARD identifier uniquely identifying the ARD, (b) current ARD RK information indicative of a currently used ARD RK out of a plurality of unique ARD RKs assigned to the ARD and stored on the ARD, and (c) ARD usage information indicative of a number of usages of the currently used ARD RK; wherein the authentication encryption is encrypted using the encryption function using an ARD derived key generated from the currently used ARD RK, and wherein the ARD derived key is generated using the derivation function;
obtain, along with the authentication encryption, a timestamp indicative of a time of creation of the authentication encryption; and upon one of the validation encryptions matching the authentication encryption and the timestamp being within an allowed time window from an authentication attempt time, authenticate the ARD, and upon none of the validation encryptions matching the authentication encryption or the timestamp not being within the allowed time window, not authenticate the ARD.

2. The system of claim 1, wherein the authentication encryption is generated by an application installed on the ARD, and wherein the plurality of unique ARD RKs assigned to the ARD are stored on a portion of the ARD inaccessible to applications other than the application.

3. The system of claim 2, wherein each of the unique ARD RKs is stored on the portion in a distributed manner so that at least a first part of a respective unique ARD RK of the unique ARD RKs is stored in a first location of the portion and a second part of the respective unique ARD RK is stored in a second location of the portion other than the first location.

4. A device comprising a processing circuitry configured to:
provide (a) a device identifier uniquely identifying the device, (b) current device root key information indicative of a currently used device root key out of a plurality of unique root keys assigned to the device and stored on the device, and (c) device root key usage information indicative of a number of usages of the currently used device root key;
generate a derived key from the currently used device root key, using a derivation function designed to generate a different derivation for identical data for each execution;
encrypt, using an encryption function using the derived key, a combination of: (a) the device identifier, (b) the current device root key information, and (c) the device root key usage information, giving rise to an authentication encryption; and
send the authentication encryption and a timestamp indicative of a time of creation of the authentication encryption to a device authentication system, thereby enabling authentication of the device, wherein the device is authenticated by the device authentication system if: (a) the authentication encryption is valid and (b) the timestamp is within an allowed time window from an authentication attempt time;
wherein each of the unique root keys has a predetermined maximal number of allowed usages for authentication and wherein upon reaching the maximal number of allowed usages for a given root key of the unique root keys, the given root key is not used for the authentication.

5. The device of claim 4, wherein the processing circuitry is further configured to receive an authentication response from the device authentication system.

6. The device of claim 4, wherein sending the authentication encryption to the device authentication system causes the device authentication system to send the device identifier to an access control management system upon successful authentication of the device, thereby enabling the device to access the access control management system.

7. The system of claim 4, wherein the authentication encryption is generated by an application installed on the device, and wherein the plurality of unique root keys assigned to the device are stored on a portion of the device inaccessible to applications other than the application.

8. The system of claim 7, wherein each of the unique root keys is stored on the portion in a distributed manner so that at least a first part of a respective unique root key of the unique root keys is stored in a first location of the portion and a second part of the respective unique root key is stored in a second location of the portion different than the first location.

9. A method for authenticating devices, the method comprising:
providing a plurality of validation encryptions including, for each given device of the devices, a plurality of encryptions of a combination of: (a) an identifier uniquely identifying the given device, (b) current Root Key (RK) information indicative of a currently used RK out of a plurality of unique RKs assigned to the given device and stored on the given device, and (c) usage information indicative of a number of usages of the currently used RK; wherein each given encryption of the validation encryptions is encrypted using an encryption function using a derived key generated from the respective currently used RK of the respective given device, and wherein the derived key is generated using a derivation function designed to generate a different derivation for identical data for each execution;
obtaining an authentication encryption generated by an Authentication Requesting Device (ARD) for authenticating the ARD, wherein the authentication encryption is a result of encryption of a second combination of: (a) an ARD identifier uniquely identifying the ARD, (b) current ARD RK information indicative of a currently used ARD RK out of a plurality of unique ARD RKs assigned to the ARD and stored on the ARD, and (c) ARD usage information indicative of a number of usages of the currently used ARD RK; wherein the authentication encryption is encrypted using the encryption function using an ARD derived key generated from the currently used ARD RK, and wherein the ARD derived key is generated using the derivation function;
obtaining, along with the authentication encryption, a timestamp indicative of a time of creation of the authentication encryption; and
upon one of the validation encryptions matching the authentication encryption and the timestamp being within an allowed time window from an authentication attempt time, authenticating the ARD, and upon none of the validation encryptions matching the authentication encryption or the timestamp not being within the allowed time window, not authenticating the ARD.

10. The method of claim 9, wherein the authentication encryption is generated by an application installed on the ARD, and wherein the plurality of unique ARD RKs assigned to the ARD are stored on a portion of the ARD inaccessible to applications other than the application.

11. The method of claim 10, wherein each of the unique ARD RKs is stored on the portion in a distributed manner so that at least a first part of a respective unique ARD RK of the unique ARD RKs is stored in a first location of the portion and a second part of the respective unique ARD RK is stored in a second location of the portion other than the first location.

12. A method comprising:
providing (a) a device identifier uniquely identifying a device, (b) current device root key information indicative of a currently used device root key out of a plurality of unique root keys assigned to the device and stored on the device, and (c) device root key usage information indicative of a number of usages of the currently used device root key;

generating a derived key from the currently used device root key, using a derivation function designed to generate a different derivation for identical data for each execution;

encrypting, using an encryption function using the derived key, a combination of: (a) the device identifier, (b) the current device root key information, and (c) the device root key usage information, giving rise to an authentication encryption; and sending the authentication encryption and a timestamp indicative of a time of creation of the authentication encryption to a device authentication system, thereby enabling authentication of the device, wherein the device is authenticated by the device authentication system if: (a) the authentication encryption is valid and (b) the timestamp is within an allowed time window from an authentication attempt time;

wherein each of the unique root keys has a predetermined maximal number of allowed usages for authentication and wherein upon reaching the maximal number of allowed usages for a given root key of the unique root keys, the given root key is not used for the authentication.

13. The method of claim 12, further comprising:
receiving an authentication response from the device authentication system.

14. The method of claim 12, wherein sending the authentication encryption to the device authentication system causes the device authentication system to send the device identifier to an access control management system upon successful authentication of the device, thereby enabling the device to access the access control management system.

15. The method of claim 12, wherein the authentication encryption is generated by an application installed on the device, and wherein the plurality of unique root keys assigned to the device are stored on a portion of the device inaccessible to applications other than the application.

16. The method of claim 15, wherein each of the unique root keys is stored on the portion in a distributed manner so that at least a first part of a respective unique root key of the unique root keys is stored in a first location of the portion and a second part of the respective unique root key is stored in a second location of the portion different than the first location.

17. A non-transitory computer readable storage medium having computer readable program code embodied therewith, the computer readable program code, executable by processing circuitry of a computer to perform a method for authenticating devices, the method comprising:

providing a plurality of validation encryptions including, for each given device of the devices, a plurality of encryptions of a combination of: (a) an identifier uniquely identifying the given device, (b) current Root Key (RK) information indicative of a currently used RK out of a plurality of unique RKs assigned to the given device and stored on the given device, and (c) usage information indicative of a number of usages of the currently used RK; wherein each given encryption of the validation encryptions is encrypted using an encryption function using a derived key generated from the respective currently used RK of the respective given device, and wherein the derived key is generated using a derivation function designed to generate a different derivation for identical data for each execution;

obtaining an authentication encryption generated by an Authentication Requesting Device (ARD) for authenticating the ARD, wherein the authentication encryption is a result of encryption of a second combination of: (a) an ARD identifier uniquely identifying the ARD, (b) current ARD RK information indicative of a currently used ARD RK out of a plurality of unique ARD RKs assigned to the ARD and stored on the ARD, and (c) ARD usage information indicative of a number of usages of the currently used ARD RK; wherein the authentication encryption is encrypted using the encryption function using an ARD derived key generated from the currently used ARD RK, and wherein the ARD derived key is generated using the derivation function;

obtaining, along with the authentication encryption, a timestamp indicative of a time of creation of the authentication encryption; and upon one of the validation encryptions matching the authentication encryption and the timestamp being within an allowed time window from an authentication attempt time, authenticating the ARD, and upon none of the validation encryptions matching the authentication encryption or the timestamp not being within the allowed time window, not authenticating the ARD.

18. A non-transitory computer readable storage medium having computer readable program code embodied therewith, the computer readable program code, executable by processing circuitry of a computer to perform a method comprising:

providing (a) a device identifier uniquely identifying a device, (b) current device root key information indicative of a currently used device root key out of a plurality of unique root keys assigned to the device and stored on the device, and (c) device root key usage information indicative of a number of usages of the currently used device root key;

generating a derived key from the currently used device root key, using a derivation function designed to generate a different derivation for identical data for each execution;

encrypting, using an encryption function using the derived key, a combination of: (a) the device identifier, (b) the current device root key information, and (c) the device root key usage information, giving rise to an authentication encryption; and sending the authentication encryption and a timestamp indicative of a time of creation of the authentication encryption to a device authentication system, thereby enabling authentication of the device, wherein the device is authenticated by the device authentication system if: (a) the authentication encryption is valid and (b) the timestamp is within an allowed time window from an authentication attempt time;

wherein each of the unique root keys has a predetermined maximal number of allowed usages for authentication and wherein upon reaching the maximal number of allowed usages for a given root key of the unique root keys, the given root key is not used for the authentication.

* * * * *